United States Patent
Ericson et al.

(10) Patent No.: US 9,824,358 B2
(45) Date of Patent: Nov. 21, 2017

(54) FRAUDULENT TRANSACTION DETECTION SYSTEM FOR USE IN IDENTITY-BASED ONLINE FINANCIAL TRANSACTION DECISIONING SYSTEM

(71) Applicant: BANK OF AMERICA CORPORATION, Charlotte, NC (US)

(72) Inventors: Colleen Marie Ericson, Phoenix, AZ (US); Reggie Scott Whitley, Monroe, NC (US)

(73) Assignee: Bank of America Corporation, Charlotte, NC (US)

( * ) Notice: Subject to any disclaimer, the term of this patent is extended or adjusted under 35 U.S.C. 154(b) by 358 days.

(21) Appl. No.: 14/597,067

(22) Filed: Jan. 14, 2015

(65) Prior Publication Data

US 2016/0203486 A1    Jul. 14, 2016

Related U.S. Application Data

(63) Continuation of application No. 13/080,330, filed on Apr. 5, 2011, now abandoned.

(60) Provisional application No. 61/441,183, filed on Feb. 9, 2011.

(51) Int. Cl.
*G06Q 20/40* (2012.01)

(52) U.S. Cl.
CPC .................. *G06Q 20/4016* (2013.01)

(58) Field of Classification Search
CPC .................. G06Q 30/00; G06Q 40/00
USPC .......................... 705/35, 38, 44, 2
See application file for complete search history.

(56) References Cited

U.S. PATENT DOCUMENTS

| | | | |
|---|---|---|---|
| 6,532,459 B1 | 3/2003 | Berson | |
| 7,333,953 B1 | 2/2008 | Banaugh et al. | |
| 8,145,562 B2 | 3/2012 | Wasserblat et al. | |
| 8,290,836 B2 * | 10/2012 | McNelley | G06Q 20/3821 705/35 |

(Continued)

OTHER PUBLICATIONS

FFIEC, Core Examination Overview and Procedures for Regulatory Requirements and Related Topics Customer Identification Program-Overview, captured on Dec. 14, 2007 by Internet Archive WayBack Machine. http://web.archive.org/web/20071214101317/http://www.ffiec.gov\bsa_infobase/pages_manual/OLM_011.htm.

(Continued)

*Primary Examiner* — Robert R Niquette
(74) *Attorney, Agent, or Firm* — Michael A. Springs; Moore & Van Allen PLLC; Peter B. Stewart

(57) ABSTRACT

Embodiments of the invention provide for systems to determine potential fraudulent activity associated with online financial transaction identity-based transaction decisioning, to electronically determine decisions for transactions such as account opening, and the like. The embodiments herein described accurately provide a system tool to prevent fraudulent transactions from occurring, such as preventing accounts from being opened by individuals who present an identity risk and efficiently identify such risky applicants early in an automated decisioning process. Specific embodiments provide for electronically determining a transaction decision based on applying business rules to potential fraud indicators. In other embodiments of the invention, a decisioning score is determined that takes into account the application of predetermined business rules to potential fraud indicators.

20 Claims, 6 Drawing Sheets

(56) References Cited

U.S. PATENT DOCUMENTS

| | | | |
|---|---|---|---|
| 8,738,488 B2* | 5/2014 | Hall | G06Q 30/06 |
| | | | 705/325 |
| 8,918,904 B2* | 12/2014 | Sanin | H04L 51/32 |
| | | | 705/38 |
| 2002/0133721 A1 | 9/2002 | Adjaoute | |
| 2003/0135457 A1 | 7/2003 | Stewart et al. | |
| 2004/0010458 A1 | 1/2004 | Friedman | |
| 2005/0216397 A1 | 9/2005 | Micci-Barreca | |
| 2006/0293981 A1 | 12/2006 | McNelley et al. | |
| 2008/0086759 A1 | 4/2008 | Colson | |
| 2010/0005013 A1 | 1/2010 | Uriarte | |
| 2010/0057622 A1 | 3/2010 | Faith et al. | |
| 2011/0288996 A1* | 11/2011 | Kreutz | G06Q 40/02 |
| | | | 705/44 |

OTHER PUBLICATIONS

Utility U.S. Appl. No. 12/365,652, filed Feb. 4, 2009.

* cited by examiner

FRAUDULENT TRANSACTION DETECTION SYSTEM FOR USE IN IDENTITY-BASED ONLINE FINANCIAL TRANSACTION DECISIONING SYSTEM

CLAIM OF PRIORITY UNDER 35 U.S.C. §119

The present application claims priority to U.S. patent application Ser. No. 13/080,330, entitled, "Identity-Based Transaction Decisioning for Online Financial Transactions," filed on Apr. 5, 2011, which, in turn, claims priority to U.S. Patent Application Ser. No. 61/441,183, entitled, "Identity-Based Transaction Decisioning for Online Financial Transactions," filed on Feb. 9, 2011, and assigned to the assignee hereof.

FIELD

In general, embodiments of the invention relate to computer network fraudulent activity security and, more particularly, a tool for communicating with online systems to detect potential fraudulent activity associated with provide identity-based transaction decisioning for online financial transactions, such as account opening transactions or the like.

BACKGROUND

Certain online financial transactions, such as opening a new account require accurate identity verification to insure that the account is not being opened fraudulently. Stated in other words, identity verification insures that the person who is opening the account online is, in fact, the person that they purport to be in the online account application.

The timeliness of identifying non-viable applications, i.e., applications in which the identity of the applicant is not verified and therefore the application is declined, is paramount to assuring that the financial institution or other account providing entity limits their costs. In this regard, the earlier in the application approval process that an application can be identified as non-viable the less processing costs occur. In a similar regard, the accuracy of the identity verification process is equally important to assure that the financial institution does not incur unnecessary costs. In this regard, falsely approved applications (i.e., applications in which the applicant fraudulently falsifies identity but are not declined by the approval process) can cost the financial institution, in terms of processing and any losses that incur due to subsequent fraudulent activity.

Currently, financial institutions rely on third party data to verify identity and subsequent decisioning assistance for approval/decline of a financial transaction request, such as opening an account or the like. The third party entity that supplies the data may be a credit reporting entity. In many instances the third party data includes an identity score however, the identity score is typically geared toward identification of credit risk, rather than the critical identification and fraud prevention functions related to certain financial transactions, such as deposit account openings and the like. As such, the identity score is typically not used as the sole indicator for identity verification. Additionally, the third party entities may provide, in addition to the identity score, other identity related information, referred to herein as potential fraud indicators, related to the applicant and/or the information submitted by the applicant. In many instances, these potential fraud indicators are not reflected in the identity score, which is an additional reason why the identity score is not implemented as the sole indicator for identity verification. In addition, the presence of potential fraud indicators in a financial transaction request often requires manual processing on behalf of the financial institution, which, as previously discussed, is a costly endeavor.

Therefore, a need exists to develop systems, methods, computer program products and the like for identity-based transaction decisioning, for example account opening decisioning, that provides accurate fraud prevention and efficiently identifies non-viable transactions/applications, so as to limit the costs incurred by the transaction-offering entity.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. The summary's sole purpose is to present some concepts of one or more embodiments in a simplified form as a prelude to the more detailed description that is presented later.

Thus, further details are provided below for methods, apparatus and computer-program products that provide for identity-based transaction decisioning of online financial transactions, such as account opening transactions and the like. The embodiments herein described accurately prevent fraudulent transactions from occurring, such as preventing accounts from being opened by individuals who present an identity risk and efficiently identify such risky applicants early in an automated decisioning process so as to limit costs incurred by manual or more involved processing. Specific embodiments provide for decisioning transactions based at least in part on applying business rules to potential fraud indicators. In other embodiments of the invention, a decisioning score is determined that takes into account the application of predetermined business rules to potential fraud indicators. The decisioning score may then serve as the sole basis for transaction decisioning or may be used in conjunction with other transaction decisioning factors such as Customer Identification Program (CIP) verification results or the like.

A method for identity-based transaction decisioning for a user attempting to conduct an online financial transaction provides for first embodiments of the invention. The method includes receiving a user (i.e., customer or potential customer) request to conduct an online financial transaction. In specific embodiments, the financial transaction may be an account opening transaction, specifically a deposit account opening transaction or the like. The method additionally includes receiving, in response to the user request, one or more user-associated potential fraud indicators. In specific embodiments, the potential fraud indicators may be received from a third-party entity, such as a credit reporting bureau or the like. The method further includes determining a transaction decision for the transaction based at least in part on applying predetermined business rules to the one or more potential fraud indicators.

In further embodiments of the method determining the transaction decision further comprises determining, via the computing device, the transaction decision, wherein the transaction decision is one of an automated authorization decision, an automated decline decision, a further manual review decision or a further automated user-questioning decision.

In further embodiments the method includes receiving, in response to the user request, a user-associated identity score. In such embodiments, determining further includes determining the transaction decision based at least in part on the identity score and the application of predetermined business rules to the one or more potential fraud indicators In further embodiments the method includes receiving, in response to the user request, a user-associated Customer Identification Program (CIP) verification result. In such embodiments, determining further includes determining the transaction decision based at least in part on the application of the predetermined business rules to the one or more potential fraud indicators, the CIP verification result and/or the identity score.

In still further specific embodiments of the method, the one or more potential fraud indicators are related to one or more of a social security number provided by the user, a physical address provided by the user, a telephone number provided by the user, a date of birth provided by the user, or a frequency of the user requesting to conduct the same or similar online financial transaction.

A method for providing a decisioning score related to a user request for conducting a financial transaction defines second embodiments of the invention. The method includes receiving a user request to conduct an online financial transaction, such as an account opening transaction, specifically a deposit account opening transaction or the like. The method further includes determining, in response to the user request, a financial transaction-associated decisioning score that is based at least in part on an occurrence or absence of one or more user-associated potential fraud indicators and business rules associated with the potential fraud indicators. In specific embodiments of the method, the decisioning score may be based at least in part on an occurrence or absence of one or more user-associated potential fraud indicators, business rules associated with the potential fraud indicators and credit risk associated with the user.

In further embodiments the method includes implementing the decisioning score to determine one of authorizing the user to conduct the financial transaction or denying the user from conducting the financial transaction. In specific embodiments of the method, the decisioning score may be the sole determining factor in determining one of authorizing the user to conduct the financial transaction or denying the user from conducting the financial transaction. In other related embodiments of such methods, implementing further includes implementing the decisioning score and a Customer Identity Program (CIP) verification result in determining one of authorizing the user to conduct the financial transaction or denying the user from conducting the financial transaction.

In still further specific embodiments of the method, the one or more potential fraud indicators are related to one or more of a social security number provided by the user, a physical address provided by the user, a telephone number provided by the user, a date of birth provided by the user, or a frequency of the user requesting to conduct the same or similar online financial transaction.

An apparatus for identity-based transaction decisioning of a user attempting to conduct an online financial transaction defines third embodiments of the invention. The apparatus includes a computing platform including a memory and at least one processor in communication with the memory. The apparatus further includes a transaction decisioning module stored in the memory, executable by the processor and configured to receive, in response to a user attempting to conduct an online financial transaction (e.g., a deposit account opening transaction or the like), one or more user-associated potential fraud indicators. The transaction decisioning module is further configured to determine a transaction decision based at least in part on application of predetermined business rules to the one or more potential fraud indicators.

In specific embodiments of the apparatus the transaction decisioning module is further configured to determine the transaction decision, wherein the transaction decision is one of an automated authorization decision, an automated decline decision, a further manual review decision or a further automated user questioning decision.

In further specific embodiments of the apparatus, the transaction decisioning module is further configured to receive, in response to the user attempting to conduct an online financial transaction, a user-associated identity score and determine the transaction decision based at least in part on the identity score and the application of the predetermined business rules to the one or more potential fraud indicators. In related specific embodiments of the apparatus, the transaction decisioning module is further configured to receive, in response to the user attempting to conduct an online financial transaction, a user-associated Customer Identification Program (CIP) verification result and determine the transaction decision based, at least in part, on any combination of the identity score, the application of the predetermined business rules to the one or more potential fraud indicators and the CIP verification result.

In still further specific embodiments of the apparatus, the one or more user-associated potential fraud indicators are related to one or more of a social security number provided by the user, a physical address provided by the user, a telephone number provided by the user, a date of birth provided by the user, or a frequency of the user requesting to conduct the online financial transaction.

Another apparatus for providing a decisioning score related to a user request for conducting a financial transaction provides for fourth embodiments of the invention. The apparatus includes a computing platform including a memory and at least one processor in communication with the memory. The apparatus further includes a decisioning score module stored in the memory, executable by the processor and configured to determine a financial transaction-associated decisioning score that is based at least in part on an occurrence or absence of one or more user-associated potential fraud indicators and business rules associated with the potential fraud indicators. In further related embodiments, the decisioning score module is configured to determine the decisioning score based at least in part on an occurrence or absence of one or more user-associated potential fraud indicators, the business rules and a credit risk associated with the user.

In specific embodiments the apparatus further includes a financial transaction decisioning module stored in the memory, executable by the processor and configured to implement the decisioning score to determine one of authorizing the user to conduct the financial transaction or denying the user from conducting the financial transaction. In related embodiments of the apparatus, financial transaction decisioning module is further configured to implement the decisioning score as a sole determining factor in determining one of authorizing the user to conduct the financial transaction or denying the user from conducting the financial transaction. While in other related embodiments of the apparatus, the financial transaction decisioning module is further configured to implement the decisioning score and a Customer Identity Program (CIP) verification result in determining one of authorizing the user to conduct the financial transaction or denying the user from conducting the financial transaction.

In further embodiments of the apparatus, the decisioning score module is further configured to determine the decisioning score in response to a user request to conduct a financial transaction, such as an account opening transaction, specifically a deposit account opening transaction or the like.

In still further embodiments of the apparatus, the potential fraud indicators are related to one or more of a social security number provided by the user, a physical address provided by the user, a telephone number provided by the user, a date of birth provided by the user, or a frequency of the user requesting to conduct the online financial transaction.

A computer program product including a non-transitory computer-readable medium defines fifth embodiments of the invention. The computer-readable medium includes a first set of codes for causing a computer to receive a user request to conduct an online financial transaction. The medium additionally includes a second set of codes for causing a computer to receive, in response to the user request, one or more user-associated potential fraud indicators. In addition, the medium includes a third set of codes for causing a computer to determine a transaction decision based at least in part on application of predetermined business rules to the one or more potential fraud indicators.

Another computer program product including a non-transitory computer-readable medium provides for sixth embodiments of the invention. The computer-readable medium includes a first set of codes for causing a computer to receive a user request to conduct an online financial transaction. In addition, the computer-readable medium includes a second set of codes for causing a computer to determine, in response to the user request, financial transaction-associated decisioning score that is based at least in part on an occurrence or absence of one or more user-associated potential fraud indicators and business rules associated with the potential fraud indicators.

Thus, further details are provided below for methods, apparatus and computer-program products that provide for identity-based transaction decisioning of online financial transactions, such as account opening transactions and the like. The embodiments herein described accurately prevent fraudulent transactions from occurring, such as preventing accounts from being opened by individuals who present an identity risk and efficiently identify such risky applicants early in an automated decisioning process so as to limit costs incurred by manual decisioning or more involved processing. Specific embodiments provide for transaction decisioning based on applying business rules to potential fraud indicators. In other embodiments of the invention, a decisioning score is determined that takes into account the application of predetermined business rules to potential fraud indicators.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
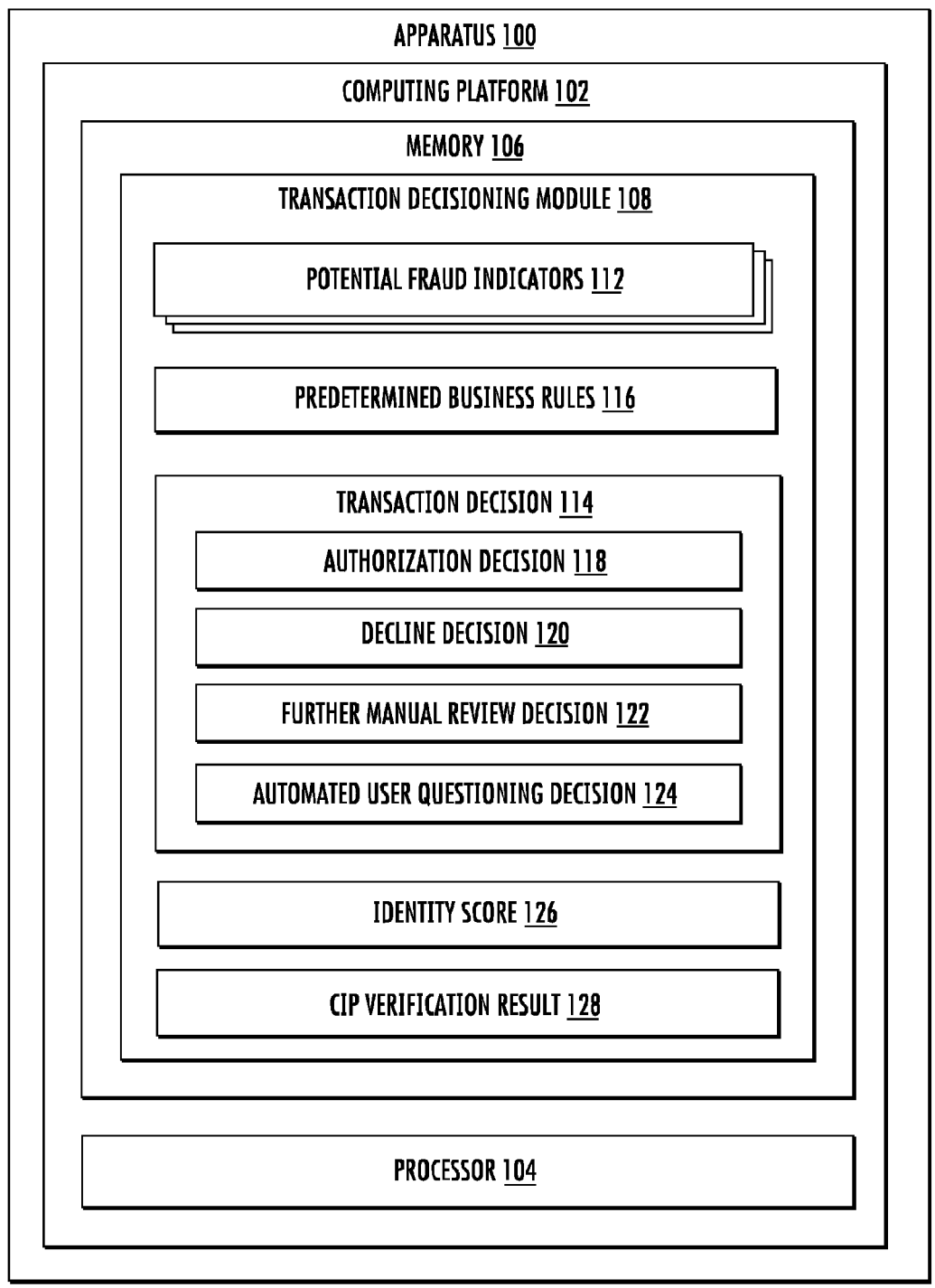
Figure 2:
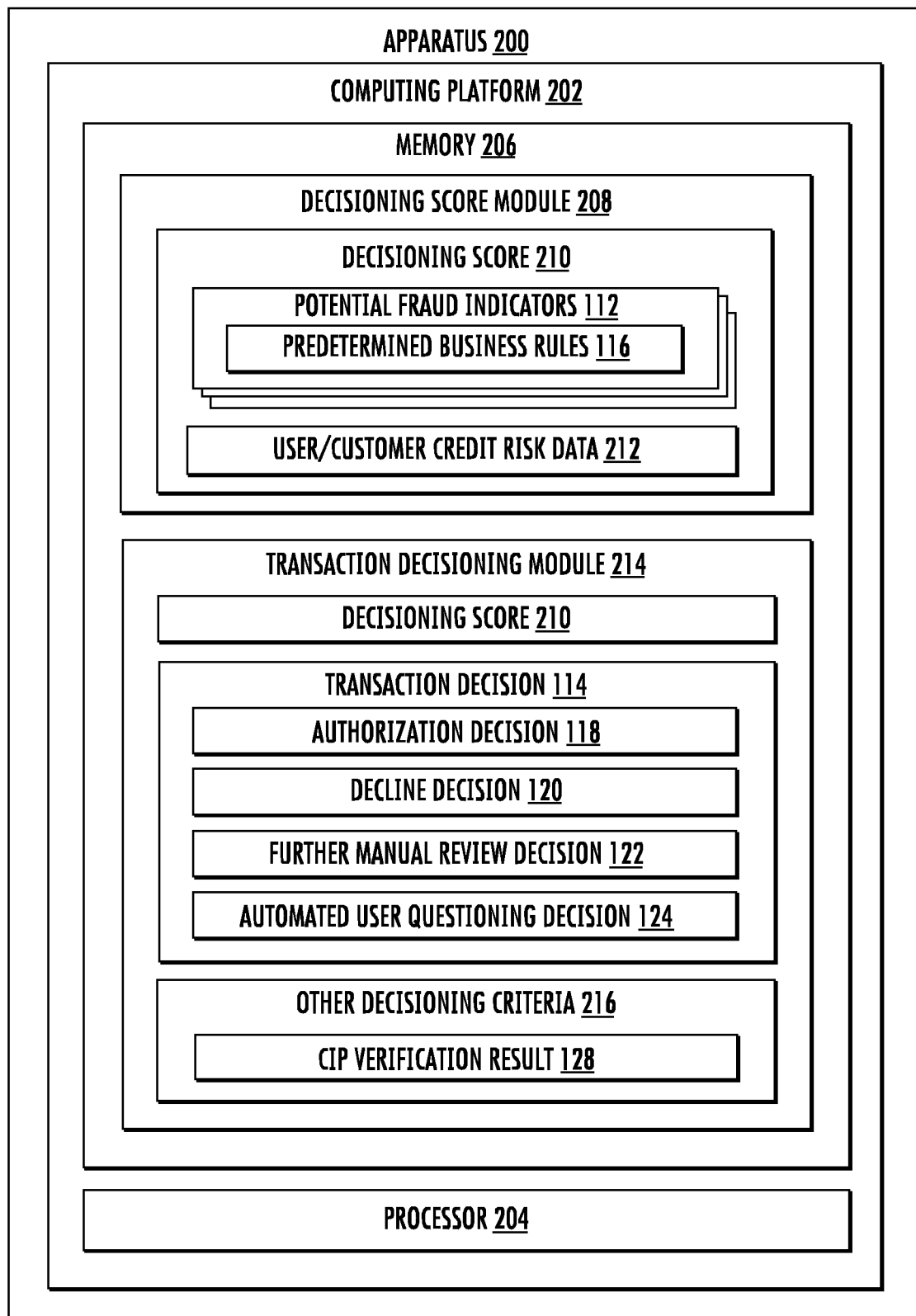
Figure 3:
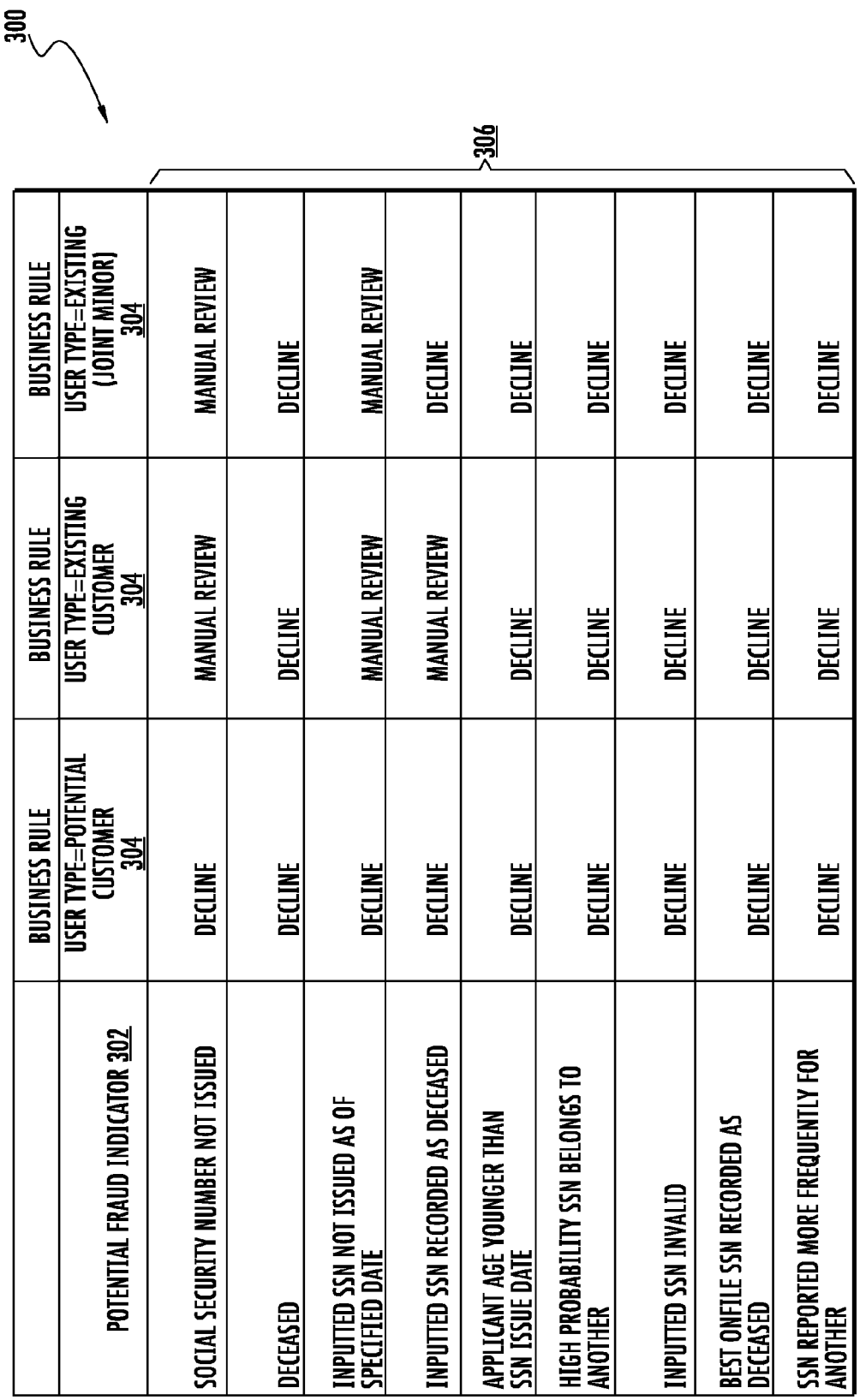
Figure 4:
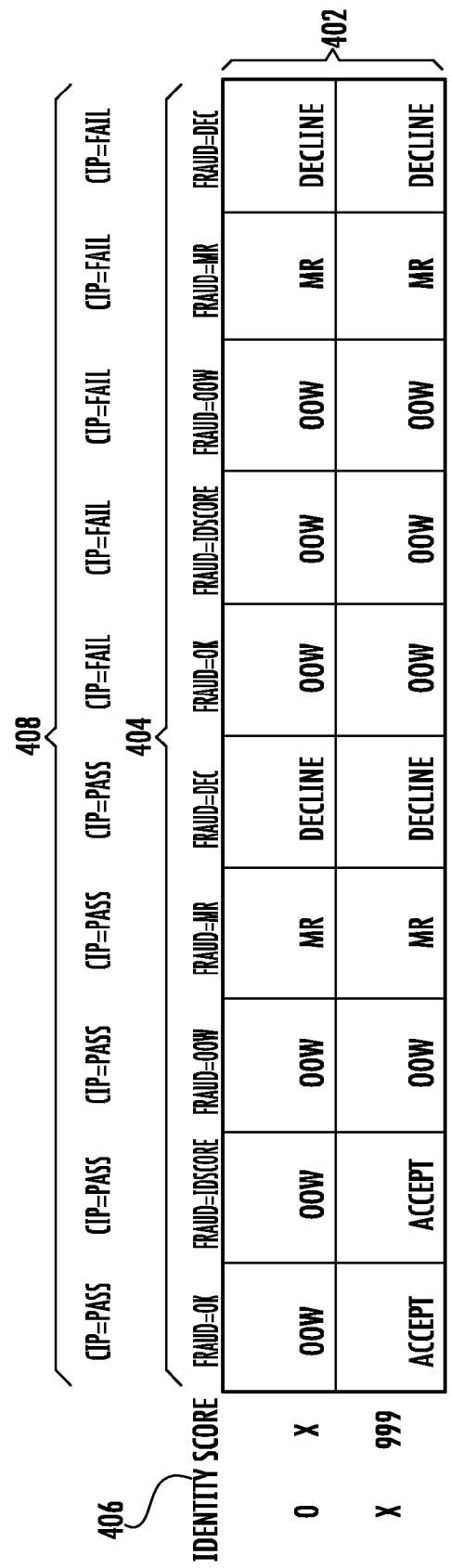
Figure 5:
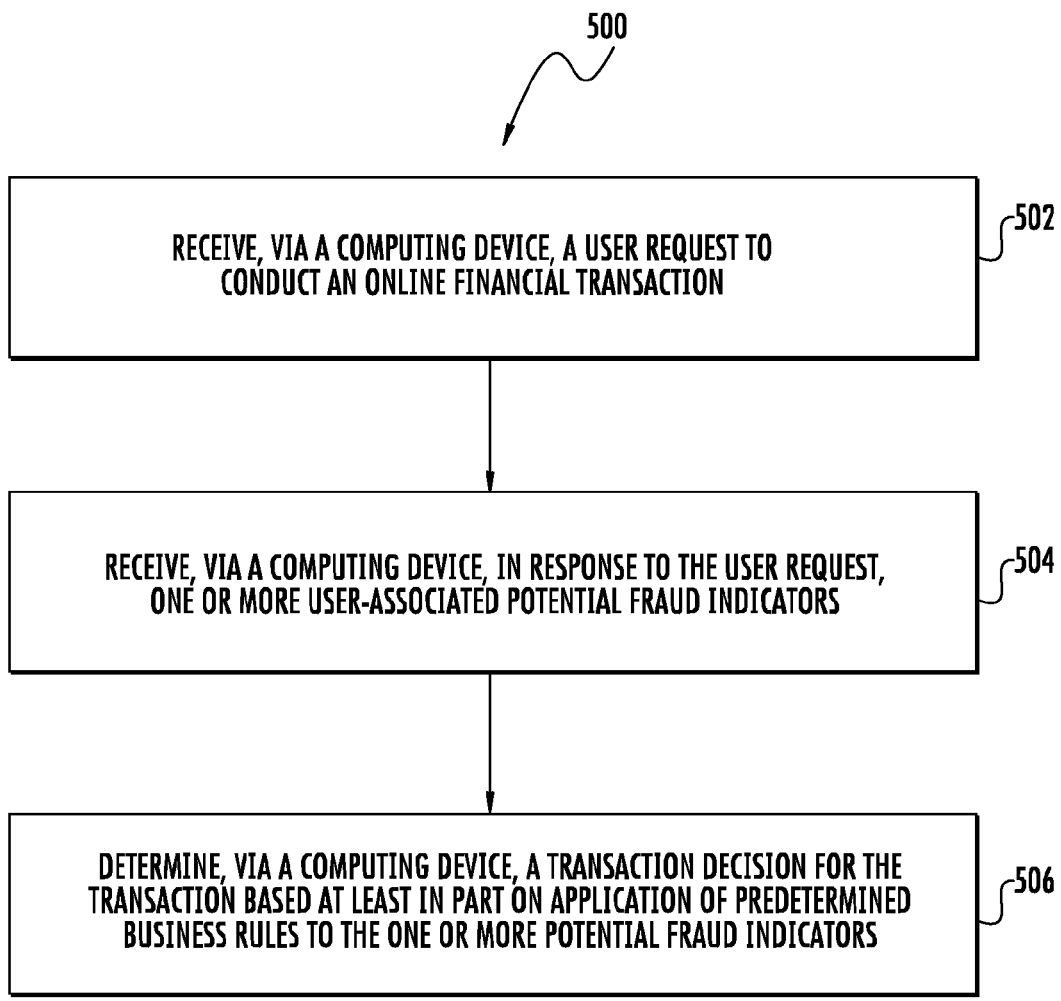
Figure 6:
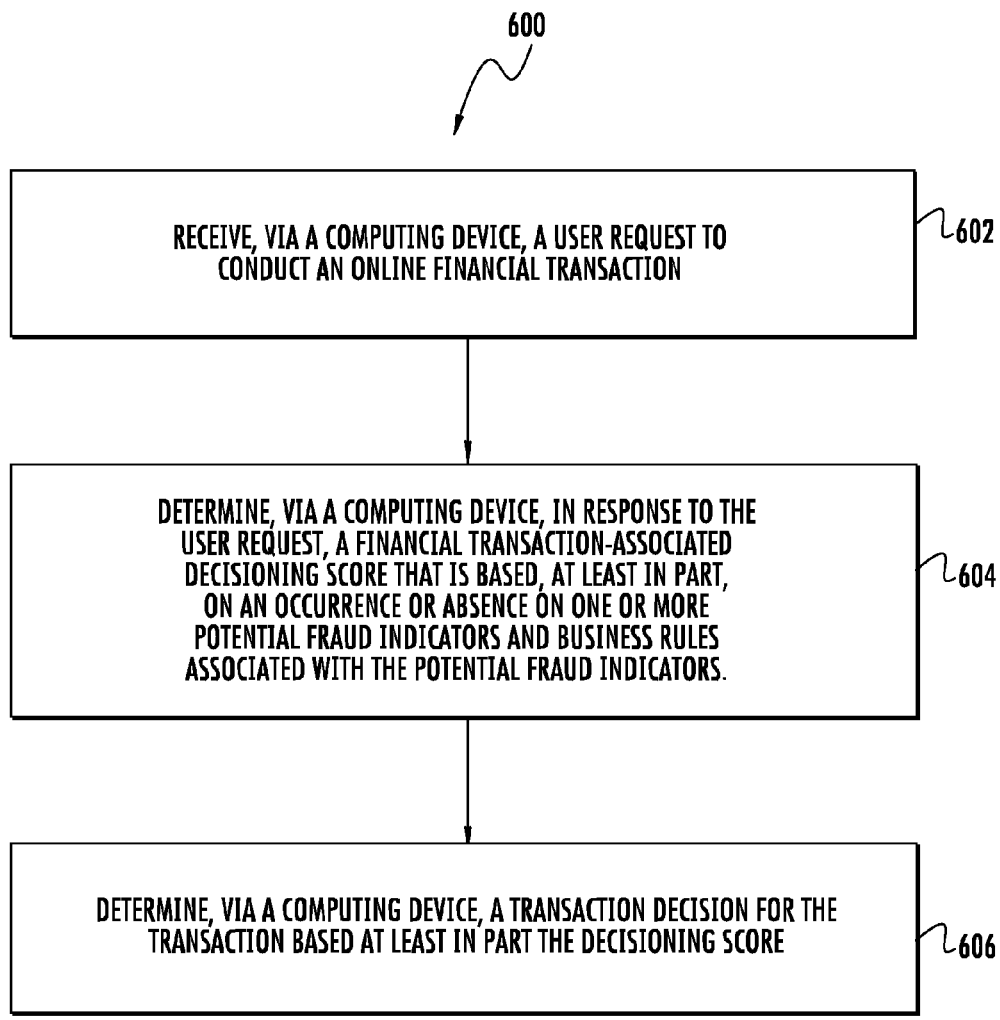

Having thus described embodiments of the invention in general terms, reference may now be made to the accompanying drawings:

FIG. 1 is a block diagram of an apparatus configured for identity-based transaction decisioning; in accordance with embodiments of the present invention;

FIG. 2 is a block diagram of an apparatus configured for decision scoring and transaction decisioning based on the decision score, in accordance with embodiments of the present invention;

FIG. 3 is a grid displaying potential fraud indicators and associated business rules per user type, in accordance with embodiments of the present invention; and FIG. 4 is grid displaying business rules associated with identity scores, CIP verification results and potential fraud indicators, in accordance with embodiments of the present invention;

FIG. 5 is a flow diagram of a method for identity-based transaction decisioning, in accordance with present embodiments of the invention; and FIG. 6 is a flow diagram of a method for decision scoring and transaction decisioning, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, device, or propagation medium. More specific examples of the computer readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, methods, apparatus and computer-program products are described in detail below that provide for identity-based transaction decisioning of online financial transactions, such as account opening transactions and the like. The embodiments herein described accurately prevent fraudulent transactions from occurring, such as preventing accounts from being opened by individuals who present an identity risk and efficiently identify such risky applicants early in an automated decisioning process so as to limit costs incurred by manual or more involved processing. Specific embodiments provide for verifying identity based on applying business rules to potential fraud indicators. In other embodiments of the invention, a decisioning score is determined that takes into account the application of predetermined business rules to potential fraud indicators. The decisioning score may then serve as the sole basis for transaction decisioning or may be used in conjunction with other transaction decisioning factors such as Customer Identification Program (CIP) verification results or the like.

FIG. 1 is a block diagram of apparatus 100 configured for identity-based transaction decisioning, in accordance with embodiments of the present invention. The apparatus 100 includes a computing platform 102 having at least one processor 104 and a memory 106 in communication with the processor.

The memory 106 of apparatus 100 stores financial transaction decisioning module 108. Transaction decisioning module 108 is executable by processor 104 and configured to receive, in response to a user (i.e., a customer or potential customer) attempting to conduct an online financial transaction, one or more user-associated potential fraud indicators 112. The potential fraud indicators 112 may be associated with information inputted by the user in attempting to conduct the financial transaction. For example, if the financial transaction is an account opening transaction, the potential fraud indicators 112 may be related to the social security number inputted by the user, a physical address inputted by the user, a telephone number inputted by the user, a date of birth inputted by the user or the like. In addition, the potential fraud indicators 112 may be associated with financial transaction historical attributes. For example, the frequency of the user requesting to conduct the online financial transaction (e.g., how many times over a specified period the user has attempted to open an account or the like). In specific embodiments, the potential fraud indicators 112 may be received from third-party entities, such as credit reporting bureaus or the like.

In addition, the transaction decisioning module 108 is further configured to determine a transaction decision 114 for the user based at least in part on application of predetermined business rules 116 to the one or more potential fraud indicators 112. The transaction decision 114 may include automatically authorizing the transaction 118, automatically declining the transaction 120, providing for further manual processing of the transaction 122, providing for additional automated questioning 124 of the user (e.g., out-of-wallet questions) or the like. The business rules 116 applied to the potential fraud indicators 114 will vary depending upon the requirements of the entity performing the transaction decisioning. In one specific example, the business rule(s) 116 applied to a potential fraud indicator will depend on the business' perceived significance of the potential fraud indicator. In other words, potential fraud indicators 112 that are deemed to be the highest risk for fraud may provide for applying a business rule that automatically declines 120 the transaction from occurring, while potential fraud indicators 112 that are deemed to be a low risk for fraud may provide for applying a business rule that automatically authorizes 118 the transaction if other criteria is satisfied (e.g., the user is a current customer of the transacting-entity or the like).

Additionally, the transaction decisioning module 108 may be configured to receive, in response to the user (i.e., a customer or potential customer) attempting to conduct the online financial transaction, an identity score 126. In such instances, the identity score 126 in combination with the application of the business rules 116 to the one or more potential fraud indicators 112 may serve as the basis for determining a transaction decision 114. In specific embodiments, the identity score 126 is received from a third party entity, such as a credit reporting bureau or the like. As such, according to specific embodiments, the identity score 126 and the potential fraud indicators 112 may be received, in unison, from a third party entity, such as a credit reporting bureau. The identity score 126 is traditionally based on historical credit information associated with the user attempting to conduct the financial transaction and is not based on the potential fraud indicators 112.

Additionally, the transaction decisioning module 108 may be configured to receive, in response to the user (i.e., a customer or potential customer) attempting to conduct the online financial transaction, a Customer Identity Program (CIP) verification result 128. CIP verification result 128 is a financial institution requirement as dictated by United States government anti-money laundering regulations. In such instances, the CIP verification result 128 in combination with the application of the business rules 116 to the one or more potential fraud indicators 112 and/or the identity score 118 may serve as the basis for determining a transaction decision 114. In specific embodiments, the CIP verification result 128 is received from a third party entity.

FIG. 2 is a block diagram of apparatus 200 configured for decisioning score determination and transaction decisioning based on the decisioning score, in accordance with embodiments of the present invention. The apparatus 200 includes a computing platform 202 having at least one processor 204 and a memory 206 in communication with the processor.

The memory 206 of apparatus 200 stores decisioning score module 208 that is executable by processor 204 and configured to determine a financial transaction-related decisioning score 210 that is based at least in part on an occurrence or absence of one or more user-associated potential fraud indicators 112 and predetermined business rules 116 associated with the fraud indicators 112. The decisioning score 210 may be determined by the transaction decisioning entity, for example a financial institution or the other transacting entity or the decisioning score 210 may be determined by a third party-entity, such as a credit reporting bureau or the like, and subsequently communicated to the transaction decisioning entity.

As previously noted, the potential fraud indicators 112 may be associated with information inputted by the user in attempting to conduct the financial transaction. For example, if the financial transaction is an account opening transaction, the potential fraud indicators 112 may be related to the social security number inputted by the user, a physical address inputted by the user, a telephone number inputted by the user, a date of birth inputted by the user or the like. In addition, the potential fraud indicators 112 may be associated with financial transaction historical attributes. For example, the frequency of the user requesting to conduct the online financial transaction (e.g., how many times over a specified period the user has attempted to open an account or the like).

As previously noted, the predetermined business rules 116 applied to the potential fraud indicators 114 and used to determine the decisioning score 210 will vary depending upon the requirements of the entity performing the transaction decisioning. In one specific example, the business rule(s) 116 applied to a potential fraud indicator will depend on the business' perceived significance of the potential fraud indicator. In other words, potential fraud indicators 112 that are deemed to be the highest risk for fraud may provide for significantly affecting the decisioning score 210 (e.g., raising the level of the decisioning score 210 to a level that warrants an automated decline decision), while potential fraud indicators 112 that are deemed to be a low risk for fraud may provide for affecting the decisioning score 210 by a certain level, such that a plurality of lower risk potential fraud indicators may raise the level of the decisioning score 210 to a level that warrants further an automated user questioning decision, a manual review processing decision or an automated decline decision.

In one specific embodiment, examples of high risk potential fraud indicators 112 in an account opening transaction include, but are not limited to, (1) the inputted social security number has been used more frequently by another; (2) a high probability that the inputted social security number belongs to another; (3) the inputted social security number is invalid or has not been issued; (4) the inputted social security number is associated with a deceased individual; (5) inputted social security number issued date prior to inputted date of birth or another date of birth associated with applicant and the like. Such potential fraud indicators 112 may be associated with a business rule 116 that raises the level of the decisioning score 210 to a level that warrants automated decline decisioning.

Other examples of potential fraud indicators 112 that may be associated with a business rule 116 that significantly raise the level of the decisioning score 210 include, but are not limited to, (1) a conflict between the inputted physical address and the on-file physical address; (2) a conflict between the inputted telephone number and the on-file telephone number or other telephone number verification source; (3) more than a predetermined number of transaction attempts in a predetermined period of time and the like. Such potential fraud indicators 112 may not, unless combined with other potential fraud factors 112, raise the score to a level that warrants automated decline decision. However, such potential fraud indicators may on their own, raise the level of the decisioning score 210 to a level that warrants further manual review and/or automated user questioning (i.e., out-of-wallet questioning).

Additionally, other potential fraud indicators 112 that may be associated with a business rule 116 may influence/raise the decisioning score 210. Such indicators may include, but are not limited to, (1) a conflict between the inputted date of birth and on-file date of birth; (2) multiple individuals connected with the inputted social security number; (3) multiple transactions connected with the inputted telephone number and the like.

In addition, other factors besides potential fraud indicators 112 may be associated with a business rule 116 and influence the decisioning score 210. Examples of such other factors include, but are not limited to, (1) the age of the applicant; (2) a name change associated with the applicant; (3) physical address conflicts or limitations (e.g., post box only) and the like.

In addition, the transaction decisioning module 208 may be further configured to determine the decision score 210 based at least in part on data associated with user/customer credit risk 212 in combination with the application of the business rules 116 to the one or more potential fraud indicators. Such data is typically used by third party entities, such as credit reporting bureaus to determine conventional identity scores and/or credit scores. In such embodiments in which data associated with user/customer credit risk 212 is included in the basis for the decision score 210, certain data should not, by itself, influence the decision score 210 to a level that would affect a decline decision. Such data associated with user/customer credit risk 212 includes, but is not limited to, (1) an initial credit/loan payment failure; (2) credit established prior to a predetermined minimum age and the like.

The memory 206 of apparatus 200 may additionally store transaction decisioning module 214. Transaction decisioning module 214 is executable by processor 204 and configured to determine a transaction decision 114 based at least in part on decisioning score 210. In specific embodiments the decisioning score 210 may be the sole basis for determining the transaction decision 114. The transaction decision 114 may include automatically authorizing the transaction 118, automatically declining the transaction 120, providing for further manual processing of the transaction 122, providing for additional automated questioning 124 of the user (e.g., out-of-wallet questions) or the like.

In other embodiments of the invention, the transaction decisioning module 214 may be configured to determine the transaction decision based at least in part on the decision score 210 and other decisioning criteria 216. For example, other decisioning criteria 216 may include, but is not limited to, CIP verification results 128 or the like.

FIG. 3 is a grid displaying various business rules associated with potential fraud indicators and user type, in accordance with embodiments of the present invention. The potential fraud indicators and associated business rules may be used to determine a transaction decision and/or determine a decision score. Potential fraud indicators 302, listed in the left-most vertical column, include inputted social security not issued; applicant is deceased (based on inputted name); inputted social security number not issued as of specified date; inputted social security number recorded as deceased; applicant age younger than social security number issue date; high probability social security number belongs to another; inputted social security number invalid; best on-file social security number recorded as deceased; and social security reported more frequently for another. User types 304 include potential customers; existing customers and existing customer-joint minor. Since the potential fraud indicators 302 shown in grid 300 are typically classified as high risk indicators, the associated business rule is predominately automated decline decision. In limited instances, the business rule is manual review decision based on the user type 304 being an existing customer and the potential fraud indicator 320 being one that may benefit from further manual investigation/questioning.

FIG. 4 is a grid 400 displaying various business rules 402 associated with potential fraud indicators 404, an identity score 406 and CIP verification results 408, in accordance with embodiments of the present invention. The business rules 402 shown in grid 400 may be used to determine a transaction decision, as described in relation to FIG. 1. The business rules 402 include accept (i.e., automated authorization decision), decline (i.e., automated decline decision); manual review (MR) (i.e., further manual review processing decision) and out-of-wallet (OOW) (i.e., further automated identity questioning of the user/applicant). The potential fraud indicator(s) 404 are associated with a business rule such as, okay (OK) (i.e., no potential fraud indicators); identity score (Idscore) (i.e., potential fraud indicators result in reliance on identity score); out-of-wallet (OOW) (i.e., potential fraud indicators require further automated identity questioning of the user/applicant); manual review (MR) (i.e., potential fraud indicators require further manual review processing); and decline (DEC) (i.e., potential fraud indicators require automated decline decision).

The identity score 406 provides for a threshold identity score "x", such that identity scores below "x" are associated with certain business rules 402 and identity scores above "x" are associated with other business rules 402. The CIP verification result 408, which is either pass or fail, such that a passing CIP verification result is associated with certain business rules 402 and a failing CIP verification result 408 is associated with other business rules 402.

Referring to FIG. 5 a flow diagram is depicted of a method 500 for identity-based transaction decisioning, in accordance with embodiments of the present invention. At Event 502, a user (e.g., customer or potential customer) request to conduct an online financial transaction is received. In specific embodiments of the invention the financial transaction may be an account opening transaction, such as a deposit account opening transaction or the like.

At Event 504, in response to the user request, one or more user-associated potential fraud indicators are received. The potential fraud indicators may be associated with information inputted by the user in attempting to conduct the financial transaction. For example, if the financial transaction is an account opening transaction, the potential fraud indicators may be related to the social security number inputted by the user, a physical address inputted by the user, a telephone number inputted by the user, a date of birth inputted by the user or the like. In addition, the potential fraud indicators may be associated with financial transaction historical attributes. For example, the frequency of the user requesting to conduct the online financial transaction (e.g., how many times over a specified period the user has attempted to open an account or the like). In specific embodiments, the potential fraud indicators may be received from third-party entities, such as credit reporting bureaus or the like.

In addition to receiving potential fraud indicators, in other embodiments, an identity score and/or a CIP verification result may be received or provided. In specific embodiments, the identity score may be received from a third party entity, such as a credit reporting bureau. In such embodiments, the identity score and the potential fraud indicators may be received in unison. The identity score is a conventional identity score typically based on the credit risk associated with the user and does not take into account the potential fraud indicators. The CIP verification result is a financial institution requirement mandated by the United States government anti-money laundering legislation.

At Event 506, a transaction decision is determined for the transaction based, at least in part, on the application of predetermined business rules to the one or more potential fraud indicators. The transaction decision may include automatically authorizing the transaction, automatically declining the transaction, providing for further manual processing of the transaction, providing for additional automated identity questioning of the user (e.g., out-of-wallet questions) or the like. In other embodiments of the method, determination of the transaction decision may be based on application of business rules to any combination of the one or more potential fraud indicators, the identity score and the CIP verification result.

Turning the reader's attention to FIG. 6 another flow diagram is presented of a method 600 for determining decisioning score and determining a transaction decision based on the decisioning score, in accordance with embodiments of the present invention. At Event 602, a user (e.g., customer or potential customer) request to conduct an online financial transaction is received. In specific embodiments of the invention the financial transaction may be an account opening transaction, such as a deposit account opening transaction or the like.

At Event 604, in response to the user request, a financial transaction-associated decisioning score is determined that is based, at least in part, on an occurrence or absence of one or more potential fraud indicators and business rules associated with the potential fraud indicators. The potential fraud indicators may be associated with information inputted by the user in attempting to conduct the financial transaction. For example, if the financial transaction is an account opening transaction, the potential fraud indicators may be related to the social security number inputted by the user, a physical address inputted by the user, a telephone number inputted by the user, a date of birth inputted by the user or the like. In addition, the potential fraud indicators may be associated with financial transaction historical attributes. For example, the frequency of the user requesting to conduct the online financial transaction (e.g., how many times over a specified period the user has attempted to open an account or the like). In other specific embodiments of the method, the decisioning score may be based on the potential fraud indicators and data associated with the credit risk of the user/customer.

At Event 606, a transaction decision is determined based, at least in part, on the decisioning score. In specific embodiments of the method, the transaction decision may be based solely on the decisioning score, while in other embodiments other transaction decision criteria may be implemented, such as CIP verification results or the like. The transaction decision may include automatically authorizing the transaction, automatically declining the transaction, providing for further manual processing of the transaction, providing for additional automated identity questioning of the user (e.g., out-of-wallet questions) or the like.

The decisioning score may be determined by the transaction decisioning entity or the decisioning score may be determined by a third-party entity, such as a credit bureau or the like.

Thus, as described above embodiments of the invention provide for identity-based transaction decisioning of online financial transactions, such as account opening transactions and the like. The embodiments herein described accurately prevent fraudulent transactions from occurring, such as preventing accounts from being opened by individuals who present an identity risk and efficiently identify such risky applicants early in an automated decisioning process so as to limits costs incurred by manual or more involved processing. Specific embodiments provide for verifying identity based on applying business rules to potential fraud indicators. In other embodiments of the invention, a decisioning score is determined that takes into account the application of predetermined business rules to potential fraud indicators.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for use in online financial transaction systems, whereby the apparatus determines potential fraudulent activity associated with identity-based transaction decisions for a user attempting to conduct a deposit account opening transaction, the apparatus comprising:

an electronic storage device; memory;
a computing processor; and
a transaction decisioning module stored in the memory electronic storage device, said module comprising instruction code executable by one or more computing processors, and configured to cause the one or more computing processors to:
receive an electronic user request to conduct a deposit account opening transaction, wherein the electronic user request indicates the user attempting to conduct the deposit account opening transaction;
receive, in response to the user attempting to conduct the deposit account opening transaction, (i) one or more user-associated potential fraud indicators and (ii) an identity score, wherein the potential fraud indicators are associated with information received from the user and financial transaction historical attributes associated with the user, wherein the financial transaction historical attributes include the frequency of the user requesting to conduct the deposit account opening transaction over a specified period, and wherein the identity score is determined independent of the potential fraud indicators, and wherein the identity score provides for a threshold such that identity scores below the threshold are associated with a first set of business rules and identity scores above the threshold are associated with a second set of business rules; and determine in response to the user request attempting to conduct the deposit account opening transaction, a financial transaction-associated score that is based at least in part on determining whether or not the user-associated potential fraud indicators indicate the occurrence of fraud and predetermined business rules associated with the user-associated potential fraud indicators;

determine a transaction decision for the deposit account opening transaction based at least in part on the financial transaction-associated score, the identity score, and the application of the predetermined business rules to the user-associated potential fraud indicators, wherein the transaction decision comprises a further automated user questioning decision; and determine whether or not to automatically decline the deposit account opening transaction based on the transaction decision determined.

2. The apparatus of claim 1, wherein the transaction decisioning module is further configured to cause one or more computing processors to determine the transaction decision, wherein the transaction decision comprises an automated authorization decision, an automated decline decision, or a further manual review decision.

3. The apparatus of claim 1, wherein the transaction decisioning module is further configured to cause one or more computing processors to receive, in response to the user attempting to conduct a deposit account opening transaction, a user-associated identity score and determine the transaction decision based on the identity score, and the application of the predetermined business rules to the user-associated potential fraud indicators.

4. The apparatus of claim 3, wherein the transaction decisioning module is further configured to cause one or more computing processors to receive, in response to the user attempting to conduct a deposit account opening transaction, a user-associated Customer Identification Program (CIP) verification result and determine the transaction decision based on the identity score, the application of the predetermined business rules to the user-associated potential fraud indicators, and the CIP verification result.

5. The apparatus of claim 1, wherein the transaction decisioning module is further configured to cause one or more computing processors to receive, in response to the user attempting to conduct a deposit account opening transaction, a user-associated Customer Identification Program (CIP) verification result and determine the transaction decision based on the application of the predetermined business rules to the user-associated potential fraud indicators and the CIP verification result.

6. The apparatus of claim 1, wherein the transaction decisioning module is further configured to cause one or more computing processors to receive, in response to a user attempting to conduct the deposit account opening transaction, the one or more user-associated potential fraud indicators.

7. The apparatus of claim 1, wherein the transaction decisioning module is further configured to cause one or more computing processors to receive, in response to a user attempting to conduct the online financial transaction, the user-associated potential fraud indicators, wherein the potential fraud indicators include information received from the user in the user request including one or more of a social security number, a physical address, a telephone number, or a date of birth.

8. The apparatus of claim 1, wherein the transaction decisioning module is further configured to cause one or more computing processors to determine the financial transaction-associated score that is based at least in part on the occurrence or absence of one or more user-associated potential fraud indicators from amongst the received user-associated potential fraud indicators, the application of the first predetermined business rules to the user-associated potential fraud indicators and a credit risk associated with the user.

9. A computer program product for use in online financial transaction systems, whereby the computer program product implements determining potential fraudulent activity associated with identity-based transaction decisions for a user attempting to conduct a deposit account opening transaction, the computer program product comprising:
 a non-transitory computer-readable medium comprising a set of codes for causing a computer to:
 receive an electronic user request to conduct a deposit account opening transaction, wherein the electronic user request indicates the user attempting to conduct the deposit account opening transaction;
 receive, in response to the user attempting to conduct the deposit account opening transaction, (i) one or more user-associated potential fraud indicators and (ii) an identity score, wherein the potential fraud indicators are associated with information received from the user and financial transaction historical attributes associated with the user, wherein the financial transaction historical attributes include the frequency of the user requesting to conduct the deposit account opening transaction over a specified period, and wherein the identity score is determined independent of the potential fraud indicators, and wherein the identity score provides for a threshold such that identity scores below the threshold are associated with a first set of business rules and identity scores above the threshold are associated with a second set of business rules; and
 determine in response to the user request attempting to conduct the deposit account opening transaction, a financial transaction-associated score that is based at least in part on determining whether or not the user-associated potential fraud indicators indicate the occurrence of fraud and predetermined business rules associated with the user-associated potential fraud indicators;
 determine a transaction decision for the deposit account opening transaction based at least in part on the financial transaction-associated score, the identity score, and the application of the predetermined business rules to the user-associated potential fraud indicators, wherein the transaction decision comprises a further automated user questioning decision; and
 determine whether or not to automatically decline the deposit account opening transaction based on the transaction decision determined.

10. The computer program product of claim 9, the computer program product further comprising a set of codes for causing a computer to determine the transaction decision, wherein the transaction decision is comprises an automated authorization decision, an automated decline decision, or a further manual review decision.

11. The computer program product of claim 9, the computer program product further comprising a set of codes for causing a computer to receive, in response to the user request, a user-associated Customer Identification Program (CIP) verification result and wherein the set of codes is further configured to cause the computer to determine the transaction decision based on the application of predetermined business rules to the user-associated potential fraud indicators and the CIP verification result.

12. The computer program product of claim 9, the computer program product further comprising a set of codes for causing a computer to receive, the potential fraud indicators, wherein the potential fraud indicators include information received from the user in the user request including one or more of a social security number, a physical address, a telephone number, or a date of birth.

13. The computer program product of claim 9, the computer program product further comprising a set of codes for causing a computer to determine the financial transaction-associated score that is based on an occurrence or absence of one or more potential fraud indicators from amongst the received user-associated potential fraud indicators, the application of predetermined business rules to the user-associated potential fraud indicators and a credit risk associated with the user.

14. A computer implemented method for use in online financial transaction systems, whereby the method provides for determining potential fraudulent activity associated with identity-based transaction decisions for a user attempting to conduct a deposit account opening transaction, the method comprising:
 receiving an electronic user request to conduct a deposit account opening transaction, wherein the user electronic request indicates the user attempting to conduct the deposit account opening transaction;
 receiving, in response to the user attempting to conduct the deposit account opening transaction, (i) one or more user-associated potential fraud indicators and (ii) an identity score, wherein the potential fraud indicators are associated with information received from the user and financial transaction historical attributes associated with the user, wherein the financial transaction historical attributes include the frequency of the user requesting to conduct the deposit account opening transaction over a specified period, and wherein the identity score is determined independent of the potential fraud indicators, and wherein the identity score provides for a threshold such that identity scores below the threshold are associated with a first set of business rules and identity scores above the threshold are associated with a second set of business rules; and
 determining in response to the user request attempting to conduct the deposit account opening transaction, a financial transaction-associated score that is based at least in part on determining whether or not the user-associated potential fraud indicators indicate the occurrence of fraud and predetermined business rules associated with the user-associated potential fraud indicators;
 determining a transaction decision for the deposit account opening transaction based at least in part on the financial transaction-associated score, the identity score, and the application of the predetermined business rules to the user-associated potential fraud indicators, wherein the transaction decision comprises a further automated user questioning decision; and determining whether or not to automatically decline the deposit account opening transaction based on the transaction decision determined.

15. The method of claim 14, wherein determining the transaction decision further comprises determining the transaction decision, wherein the transaction decision comprises an automated authorization decision, an automated decline decision, or a further manual review decision.

16. The method of claim 14, further comprising receiving in response to the user request, a user-associated identity score and wherein determining the transaction decision further comprises determining, via the computing device, the transaction decision based on the identity score and the application of the predetermined business rules to the user-associated potential fraud indicators.

17. The method of claim 16, further comprising receiving in response to the user request, a user-associated Customer Identification Program (CIP) verification result and wherein determining the transaction decision further comprises determining, via the computing device, the transaction decision based on the identity score, the application of the predetermined business rules to the user-associated potential fraud indicators and the CIP verification result.

18. The method of claim 14, further comprising receiving in response to the user request, a user-associated Customer Identification Program (CIP) verification result and wherein determining the transaction decision further comprises determining, via the computing device, the transaction decision based on the application of the predetermined business rules to the user-associated potential fraud indicators, and the CIP verification result.

19. The method of claim 14, wherein receiving the potential fraud indicators further comprises receiving the potential fraud indicators, wherein the potential fraud indicators include information received from the user in the user request including one or more of a social security number, a physical address, a telephone number, or a date of birth.

20. The method of claim 14, wherein determining the financial transaction-associated score further comprises determining the financial transaction-associated score that is based at least in part on the occurrence or absence of one or more user-associated potential fraud indicators from amongst the received user-associated potential fraud indicators, the application of the predetermined business rules to the user-associated potential fraud indicators, and a credit risk associated with the user.

\* \* \* \* \*